United States Patent
Nam et al.

(10) Patent No.: US 11,006,364 B2
(45) Date of Patent: May 11, 2021

(54) BEAM TRACKING AND RECOVERY IN CONNECTED-MODE DISCONTINUOUS RECEPTION MODE

(71) Applicant: QUALCOMM Incorporated, San Diego, CA (US)

(72) Inventors: Wooseok Nam, San Diego, CA (US); Muhammad Nazmul Islam, Littleton, MA (US); Tao Luo, San Diego, CA (US); Junyi Li, Chester, NJ (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/437,903

(22) Filed: Jun. 11, 2019

(65) Prior Publication Data
US 2019/0387470 A1   Dec. 19, 2019

Related U.S. Application Data

(60) Provisional application No. 62/685,882, filed on Jun. 15, 2018.

(51) Int. Cl.
*H04W 52/02* (2009.01)
*H04L 5/00* (2006.01)
*H04W 72/14* (2009.01)

(52) U.S. Cl.
CPC ....... *H04W 52/0216* (2013.01); *H04L 5/0055* (2013.01); *H04W 52/0238* (2013.01); *H04W 72/14* (2013.01)

(58) Field of Classification Search
CPC ......... H04W 52/0238; H04W 52/0216; H04W 72/14; H04W 76/28; H04W 72/0413;
(Continued)

(56) References Cited

U.S. PATENT DOCUMENTS 10,021,649 B2 *   7/2018   Manepalli ............... H04W 4/02
10,224,994 B2 *   3/2019   Agiwal ................ H04B 7/0617
(Continued)

OTHER PUBLICATIONS

Huawei et al., "Impacts of new RNTIs and beam failure recovery in DRX", 3GPP Draft; R2-1802535 Impacts of new RNTIs and beam failure recovery in DRX, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 26, 2018-Mar. 2, 2018, Feb. 15, 2018, XP051399537, Retrieved from the Internet: URL:http://www.3gpp.org/ftp/tsg%5Fran/WG2%5FRL2/TSGR2%5F101/Docs/ [retrieved on Feb. 15, 2018], 3 pages.
(Continued)

*Primary Examiner* — Man U Phan
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment may transmit (or a base station may receive) a beam failure recovery (BFR) request based at least in part on detecting a beam failure while the user equipment is in a discontinuous reception (DRX) mode; and the user equipment may receive (or the base station may transmit) a response to the BFR request, wherein the response uses a particular structure based at least in part on the beam failure occurring during the DRX mode. Numerous other aspects are provided.

42 Claims, 8 Drawing Sheets

(58) Field of Classification Search
CPC ..... H04W 68/02; H04W 48/10; H04W 48/12; H04W 52/02; H04L 5/0055; H04L 5/00; H04L 5/0051
USPC .......................................................... 370/311
See application file for complete search history.

(56) References Cited

U.S. PATENT DOCUMENTS

| | | | | |
|---|---|---|---|---|
| 2019/0097874 A1* | 3/2019 | Zhou | .................... | H04L 5/0023 |
| 2019/0098655 A1* | 3/2019 | Shih | ..................... | H04B 7/0695 |
| 2019/0215048 A1* | 7/2019 | Cirik | ..................... | H04B 7/088 |
| 2019/0215870 A1* | 7/2019 | Babaei | ................... | H04L 5/001 |
| 2019/0215896 A1* | 7/2019 | Zhou | .................... | H04B 7/0695 |
| 2019/0215897 A1* | 7/2019 | Babaei | ................. | H04W 76/28 |
| 2019/0239212 A1* | 8/2019 | Wang | ................... | H04L 5/0053 |
| 2019/0387572 A1* | 12/2019 | Nam | ................... | H04W 72/046 |
| 2020/0213034 A1* | 7/2020 | Zhou | .................. | H04L 27/2692 |

OTHER PUBLICATIONS

Intel: "CR to TS38.133", 3GPP Draft; 38133 CR0037 (REL-15) R4-1808533 TS38.133 V15.1.2 (Jun. 2018), 3rd Generation Partnership Project (3GPP), Mobile Competence Centre; 650, Route Des Lucioles; F-06921 Sophia-Antipolis Cedex; France, vol. RAN WG4. No. Busan. Korea (Republic of); May 21, 2018-May 25, 2018 Jun. 7, 2018, XP051452823, Retrieved from the Internet: URL:http://www.3gpp.org/ftp/3guinternal/3GPP%5FUltimate%5FCRPacks [retrieved on Jun. 7, 2018], p. 23, paragraph 6.2.2.1, p. 24, paragraph 6.2.2.2.1.2, 82 pages.
International Search Report and Written Opinion—PCT/US2019/036780—ISA/EPO—dated Sep. 19, 2019.
Samsung: "Discussion on NR C-DRX enhancement considering beamforming", 3GPP Draft; R2-1802460 Discussion on NR C-DRX enhancement considering beamforming, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 26, 2018-Mar. 2, 2018 Feb. 14, 2018, XP051399201, Retrieved from the Internet: URL:http://www.3gpp.orgjftpjtsg%5Fran/WG2%5FRL2/TSGR2%5F101/Docs/ [retrieved on Feb. 14, 2018], 4 pages.

* cited by examiner

BEAM TRACKING AND RECOVERY IN CONNECTED-MODE DISCONTINUOUS RECEPTION MODE

CROSS-REFERENCE TO RELATED APPLICATIONS UNDER 35 U.S.C. § 119

This application claims priority to U.S. Provisional Patent Application No. 62/685,882, filed on Jun. 15, 2018, entitled "TECHNIQUES AND APPARATUSES FOR BEAM TRACKING AND RECOVERY IN CONNECTED-MODE DISCONTINUOUS RECEPTION MODE," which is hereby expressly incorporated by reference herein.

FIELD OF THE DISCLOSURE

Aspects of the present disclosure generally relate to wireless communication, and more particularly to techniques and apparatuses for beam tracking and recovery in connected-mode discontinuous reception (C-DRX) mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting a beam failure recovery (BFR) request based at least in part on detecting a beam failure while the UE is in a discontinuous reception (DRX) mode; and receiving a response to the BFR request, wherein the response uses a particular structure based at least in part on the beam failure occurring during the DRX mode.

In some aspects, a UE for wireless communication may include memory and one or more processors operatively coupled to the memory. The memory and the one or more processors may be configured to transmit a BFR request based at least in part on detecting a beam failure while the UE is in a DRX mode; and receive a response to the BFR request, wherein the response uses a particular structure based at least in part on the beam failure occurring during the DRX mode.

In some aspects, a non-transitory computer-readable medium may store one or more instructions for wireless communication. The one or more instructions, when executed by one or more processors of a UE, may cause the one or more processors to transmit a BFR request based at least in part on detecting a beam failure, wherein the UE is in a DRX mode when the beam failure occurs; and receive a response to the BFR request, wherein the response uses a particular structure based at least in part on the beam failure occurring during the DRX mode.

In some aspects, an apparatus for wireless communication may include means for transmitting a BFR request based at least in part on detecting a beam failure, wherein the apparatus is in a DRX mode when the beam failure occurs; and means for receiving a response to the BFR request, wherein the response uses a particular structure based at least in part on the beam failure occurring during the DRX mode.

In some aspects, a method of wireless communication, performed by a base station, may include receiving a BFR request from a UE based at least in part on the UE being in a DRX mode when the beam failure occurs; and transmitting a response to the BFR request, wherein the response uses a particular structure based at least in part on the beam failure occurring during the DRX mode.

In some aspects, a base station for wireless communication may include memory and one or more processors operatively coupled to the memory. The memory and the one or more processors may be configured to receive a BFR request from a UE based at least in part on the UE being in a DRX mode when the beam failure occurs; and transmit a response to the BFR request, wherein the response uses a particular structure based at least in part on the beam failure occurring during the DRX mode.

In some aspects, a non-transitory computer-readable medium may store one or more instructions for wireless communication. The one or more instructions, when executed by one or more processors of a base station, may cause the one or more processors to receive a BFR request from a UE based at least in part on the UE being in a DRX mode when the beam failure occurs; and transmit a response to the BFR request, wherein the response uses a particular structure based at least in part on the beam failure occurring during the DRX mode.

In some aspects, an apparatus for wireless communication may include means for receiving a BFR request from a UE based at least in part on the UE being in a DRX mode when the beam failure occurs; and means for transmitting a response to the BFR request, wherein the response uses a particular structure based at least in part on the beam failure occurring during the DRX mode.

Aspects generally include a method, apparatus, system, computer program product, non-transitory computer-readable medium, user equipment, base station, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
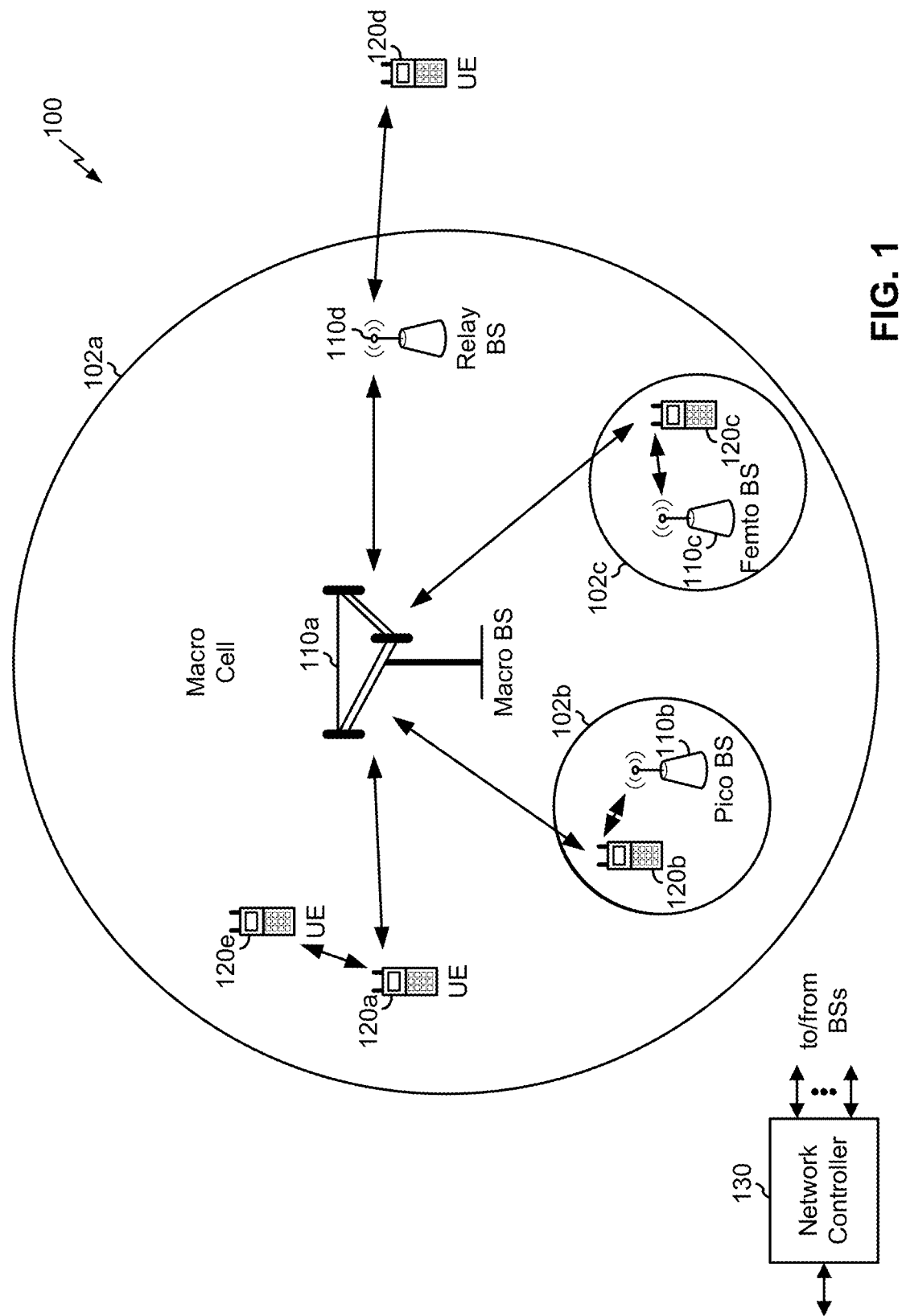
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples may differ from what is described with regard to FIG. 1.

Figure 2:
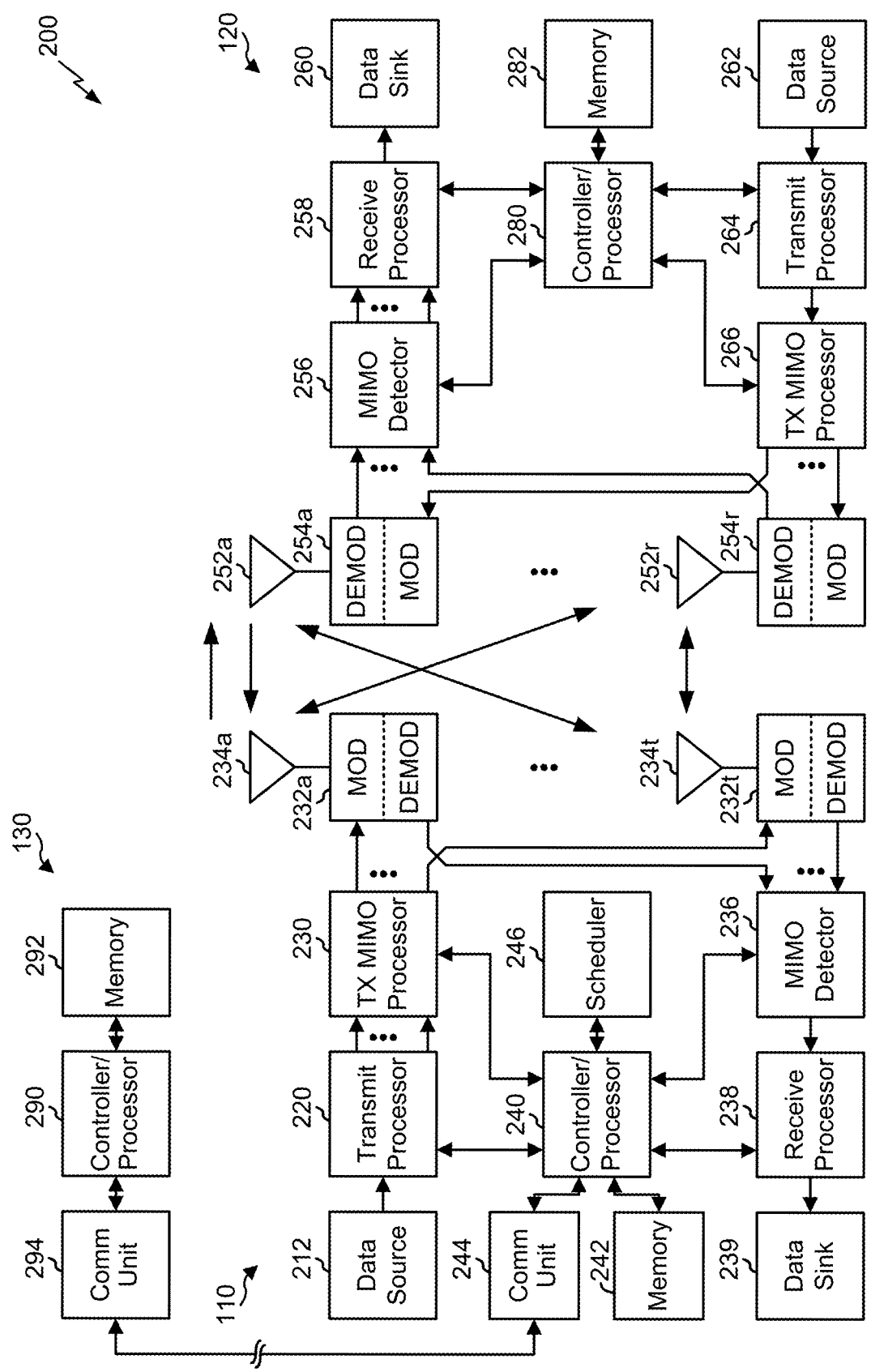
FIG. 2 is a block diagram conceptually illustrating an example of a base station in communication with a UE in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controller/processor 240 of BS 110, controller/processor 280 of UE 120, and/or any other component(s) of FIG. 2 may perform one or more techniques associated with beam failure recovery signaling for connected-mode discontinuous reception mode, as described in more detail elsewhere herein. For example, controller/processor 240 of BS 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for transmitting a beam failure recovery (BFR) request based at least in part on detecting a beam failure while the UE is in a discontinuous reception (DRX) mode; means for receiving a response to the BFR request, wherein the response uses a particular structure based at least in part on the beam failure occurring during the DRX mode; means for transmitting an acknowledgment or a negative acknowledgment corresponding to the response; means for receiving, during an awake period of the DRX mode and after the response is received, information for a BFR procedure; and/or the like. In some aspects, such means may include one or more components of UE 120 described in connection with FIG. 2.

In some aspects, BS 110 may include means for receiving a beam failure recovery (BFR) request from a user equipment (UE) based at least in part on the UE being in a discontinuous reception (DRX) mode when the beam failure occurs; means for transmitting a response to the BFR request, wherein the response uses a particular structure based at least in part on the beam failure occurring during the DRX mode; means for receiving an acknowledgment or a negative acknowledgment corresponding to the response; means for transmitting, during an awake period of the DRX mode and after the response is transmitted, information for a BFR procedure; and/or the like. In some aspects, such means may include one or more components of BS 110 described in connection with FIG. 2.

As indicated above, FIG. 2 is provided merely as an example. Other examples may differ from what is described with regard to FIG. 2.

Figure 3A:
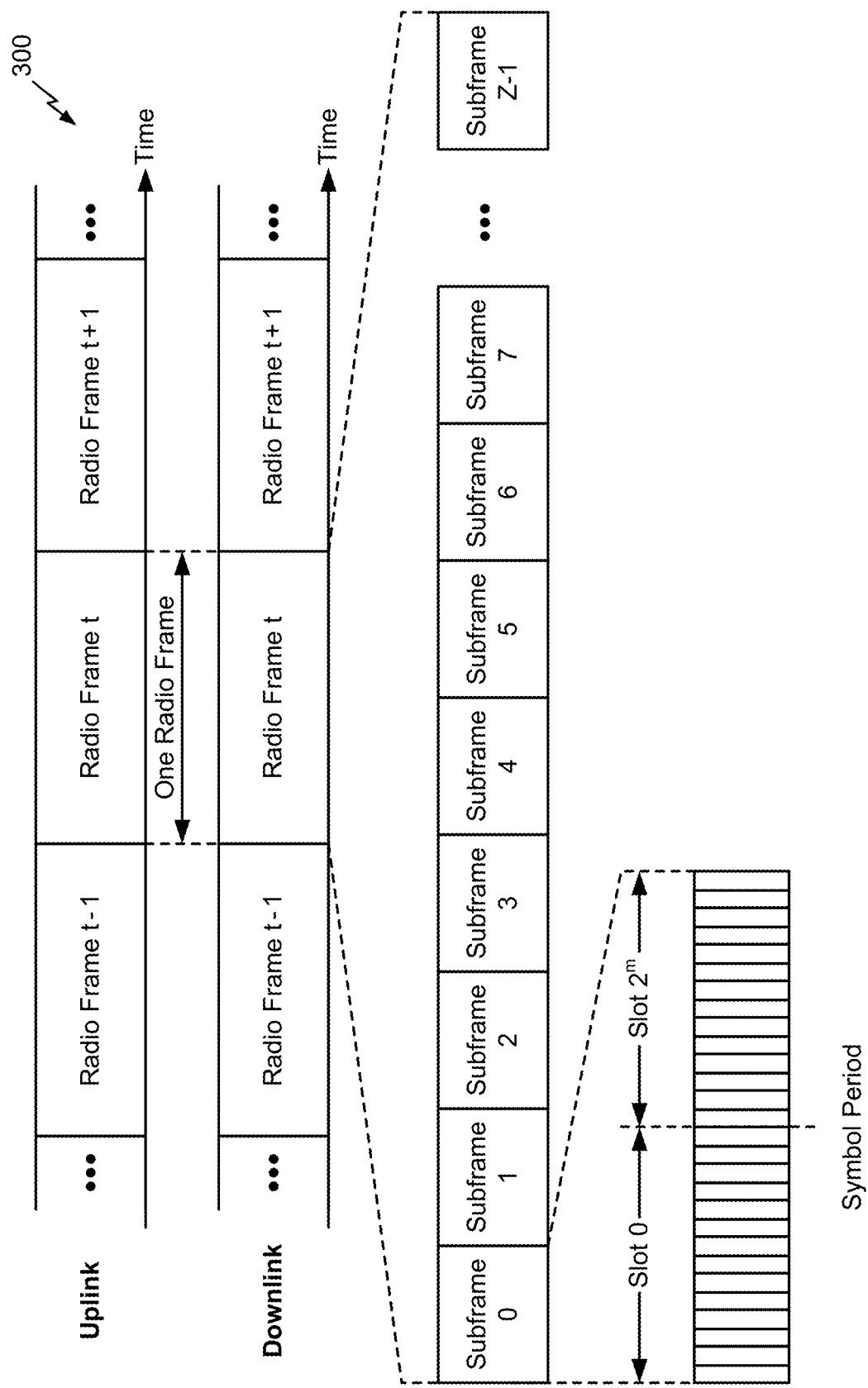
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
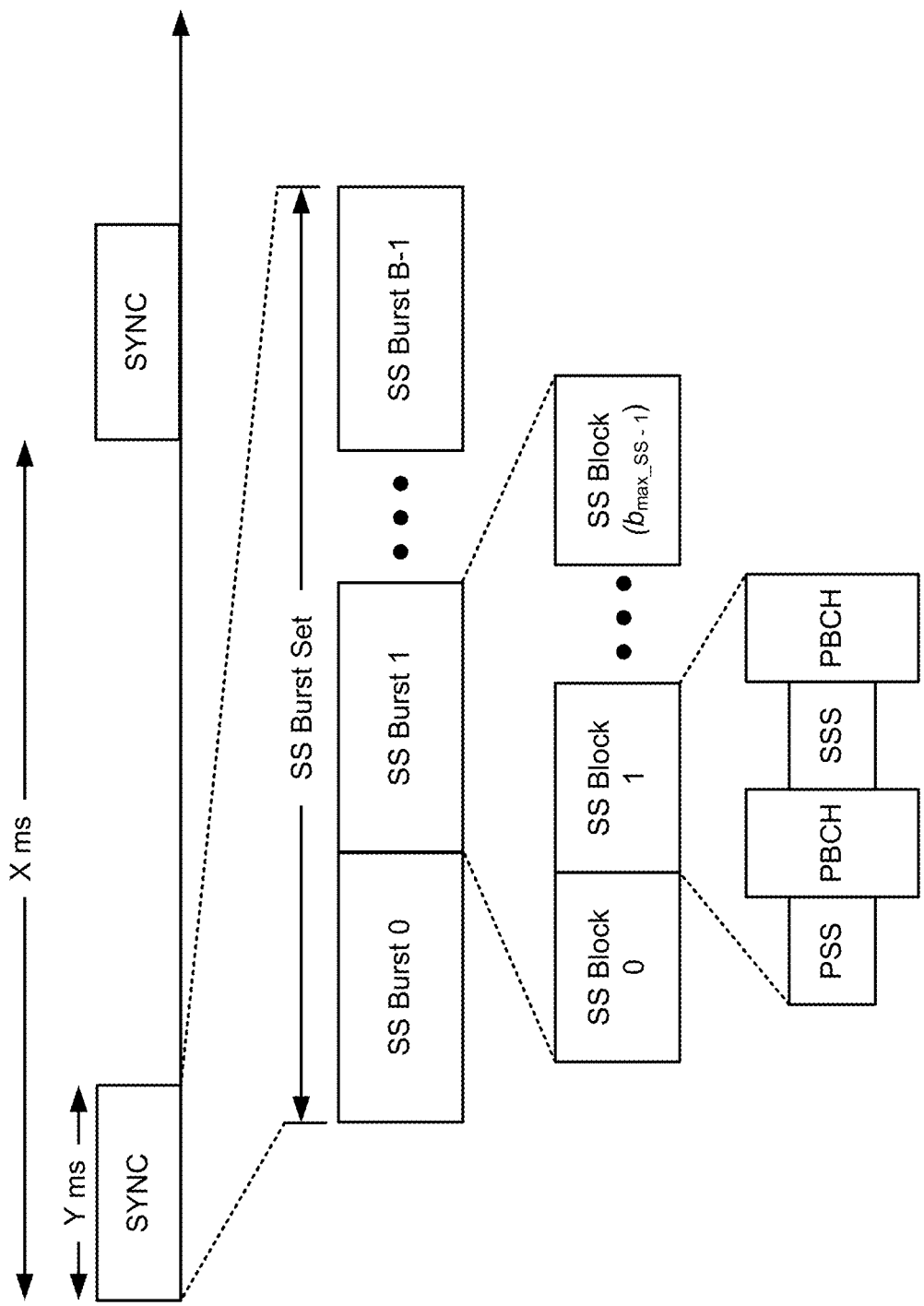
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-i}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
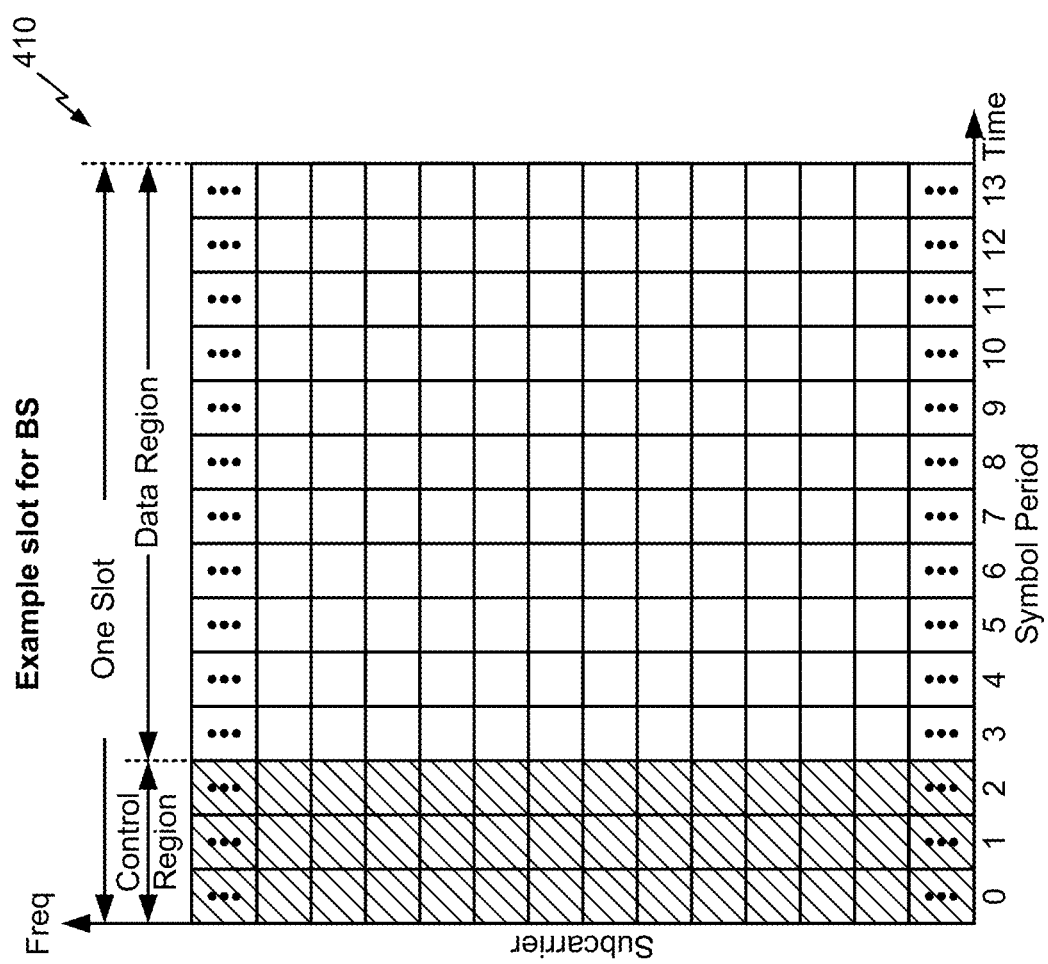
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

Beamforming may be supported and beam direction may be dynamically configured. MIMO transmissions with pre-coding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

If there is no data traffic destined to or originated from a UE for a certain period of time, the UE may operate in a discontinuous reception (DRX) mode (e.g., a connected-mode DRX (C-DRX) mode) wherein the UE transitions between an active state (e.g., an awake period where the UE wakes up to determine if data is available for the UE) and a sleep state (e.g., where the UE shuts down various hardware/processes to conserve power). The UE may determine if data is available by monitoring a control channel during an awake period (e.g., an onDuration in LTE and NR), such as a physical downlink control channel (PDCCH). The PDCCH may carry or otherwise convey an indication that the base station has data ready to transmit to the UE. If the UE receives a PDCCH or data transmission (e.g., a physical downlink shared channel (PDSCH)) from the base station during an active state, the UE may terminate the DRX mode. Otherwise, the UE returns to the sleep state at the end of the active state.

In some aspects, the UE may receive a wakeup signal before an active state. The wakeup signal may indicate that the UE should wake up to monitor the control channel and/or receive data transmission from the base station for the next active state. When the UE does not receive the wakeup signal, the UE may know that no control channel and corresponding data transmission will be received during the next active state, and may therefore skip the active state, thereby saving battery power. In some aspects, a particular module or sub-system of the UE may receive the wakeup signal. This module or sub-system may be referred to herein as a wakeup receiver. This conserves battery and radio resources that would otherwise be used to activate entire communication chains and/or processors of the UE to receive the wakeup signal.

In 5G/NR, and particularly in mmW systems above 6 GHz carrier frequencies, the communication between the UE and the BS may use beam-paired links (sometimes abbreviated BPL). A beam-paired link may include a transmit beam (e.g., at the BS side) and a receive beam (at the UE-side) for a downlink, and vice versa for an uplink. For each UE, a finite set of active beam-paired links may be maintained. The UE and/or the base station may search for new beam-paired links and maintain active or existing beam-paired links using various beam management processes. However, during the sleep state of the C-DRX cycle, the UE may not perform active beam management processes. This may lead to significant deviation or drift in the beam pair and in time/frequency synchronization of the UE, which may be particularly problematic in high mobility states, long sleep states, and/or the like.

A UE may report beam failure when an assessment of a set of reference beams does not satisfy a quality threshold. For example, in C-DRX mode, the BS may configure a UE with N reference beams whose measurements may be used to trigger events and to derive wakeup signal decoding performance (N≥1). A reference beam may be one of the beams used for synchronization signals (e.g., synchronization signal blocks (SSBs)) by the base station. In such a case, the measurement of the reference beams may be performed by receiving corresponding synchronization signals from the base station. For the measurement, the UE may wake up occasionally during the sleep state of the C-DRX cycle, in addition to the regular wake-ups for active states. A C-DRX beam failure event can be triggered if the quality of all N beams does not satisfy a threshold. In such a case, the UE may initiate a beam failure recovery (BFR) procedure to request or configure new beams (e.g., N new beams) that the BS may use for wakeup signal transmission. The BS may sweep the wakeup signal through the configured N reference beams (N≥1).

For the above beam recovery procedure during C-DRX operation, similar signaling and a similar procedure as for the non-DRX mode beam failure recovery procedure can be used. For example, the UE may send random access preambles so that the BS can detect the beam failure event and identify new beams. However, the beam failure recovery procedure may take a significant amount of time and resources. If the UE remains awake throughout the BFR procedure, battery power may be consumed unnecessarily. Furthermore, in a long duration of traffic inactivity (e.g., multiple C-DRX cycles), there may be multiple beam failure events. Performing the full BFR procedure for each beam failure event may be wasteful of UE and BS resources. Furthermore, the UE and the BS may only exchange information regarding beams for wakeup signal transmission, not for full data transmission. Therefore, it may be wasteful to perform a full BFR procedure during a C-DRX sleep cycle.

Some techniques and apparatuses described herein may provide beam tracking and recovery for a C-DRX mode. For example, a UE may transmit a BFR request in connection with a beam failure in a C-DRX mode. The BS may transmit a simplified signal (e.g., simplified in comparison to a non-DRX BFR response that may include beam information) as a response to the BFR request. Further configuration of the beam pair between the BS and the UE may be deferred until the UE terminates the C-DRX mode based at least in part on a wakeup signal. In this way, the BS and the UE may conserve resources that would otherwise be used to perform a full BFR procedure during the C-DRX sleep cycle.

Figure 5:
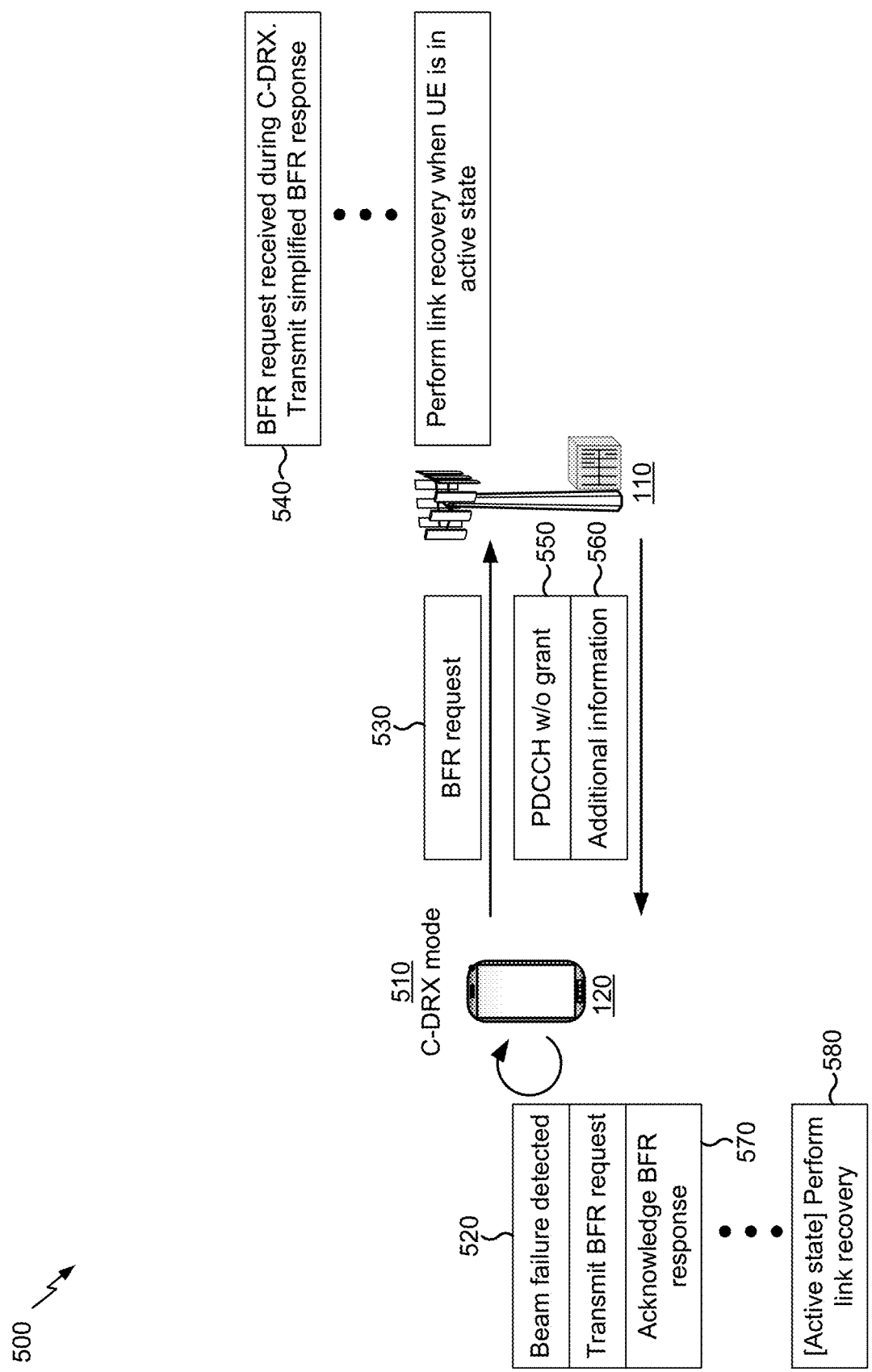
FIG. 5 is a diagram illustrating an example of beam failure recovery signaling for connected-mode discontinuous reception (C-DRX) mode, in accordance with various aspects of the present disclosure.

FIG. 5 is a diagram illustrating an example 500 of BFR signaling for C-DRX mode, in accordance with various aspects of the present disclosure.

As shown in FIG. 5, and by reference number 510, the UE 120 may be in a C-DRX mode. In such a case, the UE 120 may experience beam failure during sleep states of the C-DRX cycle, as described in more detail elsewhere herein.

As shown by reference number 520, the UE 120 may detect a beam failure. For example, the UE 120 may detect a beam failure based at least in part on a beam management procedure. The UE 120 may perform the beam management procedure periodically (e.g., based at least in part on a length of the C-DRX cycle, as defined by a variable such as longDRXCycle or shortDRXCycle). The BS 110 may configure the UE 120 with a set of reference beams. When performance of the reference beams fails to satisfy a threshold (e.g., when all reference beams do not satisfy a quality threshold), the UE 120 may trigger a beam failure. In some cases, beam failure may reliably or predictably occur during a sleep state of the C-DRX cycle.

As shown by reference number 530, the UE 120 may transmit a BFR request for a BFR procedure. For example, the UE 120 may transmit information indicating that beam failure has occurred, to cause the BS 110 to initiate a BFR procedure. In some aspects, the BFR request may include a preamble, such as a random access preamble. The preamble may indicate that the message is a BFR request. In some aspects, the BFR request may identify one or more candidate beams. For example, the UE 120 may identify the one or more candidate beams for transmission of a wakeup signal for the UE 120. By identifying the one or more candidate beams for transmission of the wakeup signal, the UE 120 enables transmission of the wakeup signal by the BS 110 without performing a full BFR procedure, which conserves resources of the UE 120 and the BS 110 that would otherwise be used to perform the full BFR procedure.

As shown by reference number 540, the BS 110 may receive the BFR request during the UE 120's sleep state of the C-DRX cycle. For example, the BS 110 may determine that the UE 120 is in a sleep state of the C-DRX cycle when the BS 110 receives the BFR request, when the BFR request indicates that beam failure has occurred, or when the UE determined that beam failure has occurred. Therefore, the BS 110 may transmit a BFR response that is simplified in comparison to a non-DRX BFR response. For example, the BFR response may use a particular structure that is based at least in part on the beam failure occurring during the DRX mode (e.g., the sleep state of the C-DRX cycle) of the UE 120. In some aspects, the particular structure may include a control channel (e.g., a PDCCH) without a grant, a Layer 1 signal, and/or the like. The UE 120 may determine that a BFR procedure is not to be performed based at least in part on the BFR response having the particular structure (e.g., the UE 120 may determine that the BFR procedure may be delayed based at least in part on the BFR response having the particular structure). For example, when the UE 120 receives the BFR response with the particular structure, the UE 120 may determine that the BFR procedure is not to be performed until a wakeup signal is received using the beams identified in the BFR request. In this way, processor and battery resources of the UE 120 are conserved that would otherwise be used to perform the BFR procedure (e.g., instead of entering or remaining in the sleep state).

A non-DRX BFR response may include a PDCCH with scheduling information. For example, the PDCCH may include a cyclic redundancy check that is scrambled using a cell radio network temporary identifier, and may be transmitted during a random access response (RAR) monitoring window. The PDCCH may schedule a PDSCH for the UE 120, and the PDSCH may deliver additional information for link recovery of the UE 120, such as a radio resource control (RRC) configuration message for one or more new beams. However, the process of scheduling and communicating for the BFR procedure may be resource-intensive and unnecessary for the UE 120 when the UE 120 is in the sleep state of the C-DRX cycle. For example, the UE 120 may stay awake for an entirety of the BFR procedure, which is battery-intensive.

As shown by reference number 550, in some aspects, the BFR response may include a PDCCH without a grant. For example, the BFR response may use a downlink control information (DCI) with a cyclic redundancy check that is scrambled using a cell radio network temporary identifier (C-RNTI) of the UE 120. In some aspects, the DCI may use a compact format without a downlink scheduling grant or an uplink scheduling grant. In this way, the BS 110 and the UE 120 may conserve resources that would otherwise be used to schedule further communication between the UE 120 and the BS 110.

In some aspects, the BFR response may include a particular waveform or a particular downlink sequence transmission that is known to the UE 120 to be a BFR response. In some aspects, the BFR response may include a reference signal, such as a channel state information reference signal (CSI-RS) or a similar reference signal. In some aspects, the above waveforms, transmissions, or signals may be referred to as Layer 1 (e.g., physical layer) signals. The usage of such Layer 1 signals may conserve processor resources of the BS 110 that would otherwise be used to generate a higher-layer message or signal.

As shown by reference number 560, in some aspects, the BFR response may include additional information (e.g., information other than the PDCCH without the grant). For example, the additional information may include information regarding an activity that the UE 120 is to perform, configuration information or control information for the UE 120, and/or the like. In some aspects, the additional information may be provided in a DCI field of the PDCCH (e.g., when the BFR response is a PDCCH without a scheduling grant), or may be provided in the form of an encoded/modulated waveform or downlink sequence.

In some aspects, the information may include downlink control information for an uplink power control of the UE 120. For example, the information may indicate that the UE 120 is to increase or decrease a transmission power for a next BFR request (e.g., a next random access preamble) of the UE 120. In this way, the BS 110 may improve coverage and/or energy efficiency of the UE 120.

In some aspects, the additional information may include an uplink grant. For example, the uplink grant may be for a buffer status report, a power headroom report, a channel state feedback request, and/or the like. In some aspects, the uplink grant may be for an unfinished uplink transmission from a previous active state of the UE 120's C-DRX cycle. In some aspects, the additional information may include a downlink grant. For example, the downlink grant may be for a higher-layer control message delivery (e.g., a system information update and/or the like), a media access control control element (MAC-CE) (e.g., for a timing advance (TA) command for uplink timing adjustment), and or the like. In some aspects, if the downlink grant is delivered by PDCCH (e.g., if the BFR response is a PDCCH), an existing paging PDSCH design for a short message delivery can be used.

In some aspects, the additional information may indicate that the C-DRX cycle is to be terminated. For example, the BS 110 may determine that urgent traffic is to be provided to the UE 120. In such a case, the BS 110 may provide the additional information to cause the UE 120 to end the C-DRX cycle. In such a case, the BS 110 and the UE 120 may perform the BFR procedure after the additional information is transmitted.

As shown by reference number 570, the UE 120 may acknowledge the BFR response. For example, the UE 120 may transmit an acknowledgment (ACK) to indicate, to the BS 110, that the UE 120 successfully received the BFR response. In some aspects, when the UE 120 does not successfully receive the BFR response, the UE 120 may transmit a negative ACK (NACK) to the BS 110. In some cases, another preamble transmission from the UE can be used as the ACK/NACK transmission. In this way, the UE 120 enables indication of successful reception of the BFR response, which conserves resources that would otherwise be used to transmit unnecessary repetitions of the BFR response to improve coverage.

As shown by reference number 580, the BS 110 and the UE 120 may perform link recovery. For example, the BS 110 and the UE 120 may perform the link recovery when the UE 120 enters an active state (e.g., based at least in part on the C-DRX cycle and/or a wakeup signal transmitted by the BS 110). In some aspects, the BS 110 may transmit a wakeup signal to the UE 120. For example, the BS 110 may transmit the wakeup signal using one or more beams that are indicated by the BFR request transmitted by the UE 120. The wakeup signal may cause the UE 120 to awaken (e.g., enter an active state) as part of the C-DRX cycle. At this point, the UE 120 and the BS 110 may exchange messaging or information to configure data communication between the UE 120 and the BS 110, such as beam pair information, RRC information, and/or the like. In this way, the UE 120 and the BS 110 exchange low-overhead messaging to indicate a BFR request and a corresponding BFR response without initiating an immediate BFR procedure, which conserves battery and radio resources of the UE 120 and the BS 110.

As indicated above, FIG. 5 is provided as an example. Other examples may differ from what is described with respect to FIG. 5.

Figure 6:
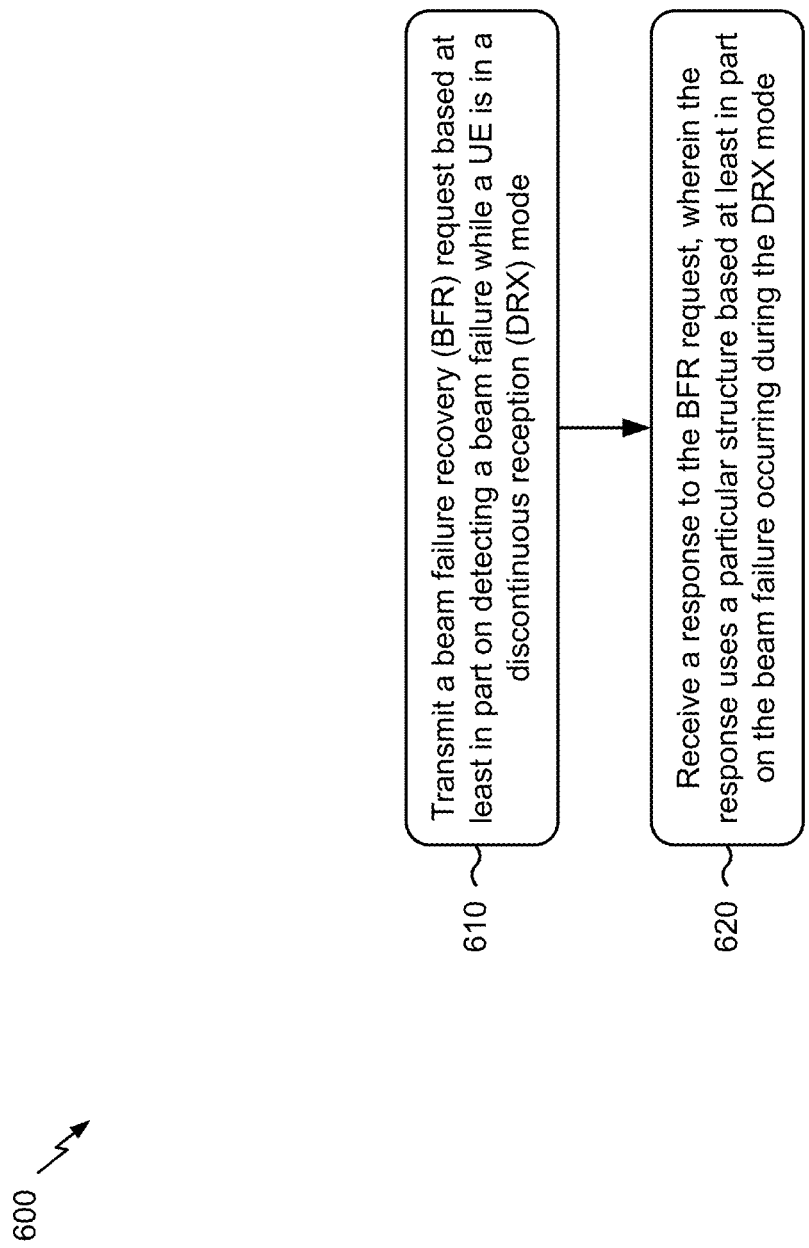
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs signaling related to a BFR procedure during C-DRX.

As shown in FIG. 6, in some aspects, process 600 may include transmitting a beam failure recovery (BFR) request based at least in part on detecting a beam failure while the UE is in a discontinuous reception (DRX) mode (block 610). For example, the UE (e.g., using controller/processor 280, transmit processor 264, TX MIMO processor 266, MOD 254, antenna 252, and/or the like) may transmit a BFR request, as described above, for example, with reference to FIG. 5. The UE may transmit the BFR request based at least in part on detecting a beam failure. In some aspects, the UE may transmit the BFR request when the UE is in a DRX mode (e.g., a C-DRX mode) or when the beam failure occurs while the UE is in the DRX mode (e.g., the sleep state of the C-DRX mode).

As shown in FIG. 6, in some aspects, process 600 may include receiving a response to the BFR request, wherein the response uses a particular structure based at least in part on the beam failure occurring during the DRX mode (block 620). For example, the UE (e.g., using antenna 252, DEMOD 254, MIMO detector 256, receive processor 258, controller/processor 280, and/or the like) may receive a response (e.g., a BFR response) to the BFR request, as described above, for example, with reference to FIG. 5. The response may use a particular structure. For example, the response may use the particular structure based at least in part on the beam failure occurring during the DRX mode. In some aspects, the response may use the particular structure based at least in part on the UE transmitting the BFR request while the UE is in the DRX mode.

Process 600 may include additional aspects, such as any single aspect or any combination of aspects described below and/or in connection with one or more other processes described elsewhere herein.

In a first aspect, the particular structure is a downlink control channel without a scheduling grant. In a second aspect, alone or in combination with the first aspect, the response includes downlink control information with a cyclic redundancy check that is scrambled using a cell radio network temporary identifier (C-RNTI). In a third aspect, alone or in combination with one or more of the first and second aspects, the particular structure is at least one of a particular waveform, a particular downlink sequence, or a reference signal.

In a fourth aspect, alone or in combination with one or more of the first through third aspects, the UE transmits an acknowledgment or a negative acknowledgment corresponding to the response. In a fifth aspect, alone or in combination with one or more of the first through fourth aspects, the response includes at least one of information regarding uplink power control for the UE, an uplink grant, a downlink grant, or information indicating that the DRX mode is to be terminated. In a sixth aspect, alone or in combination with one or more of the first through fifth aspects, the UE may receive, during an awake period of the DRX mode and after the response is received, information for a BFR procedure.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
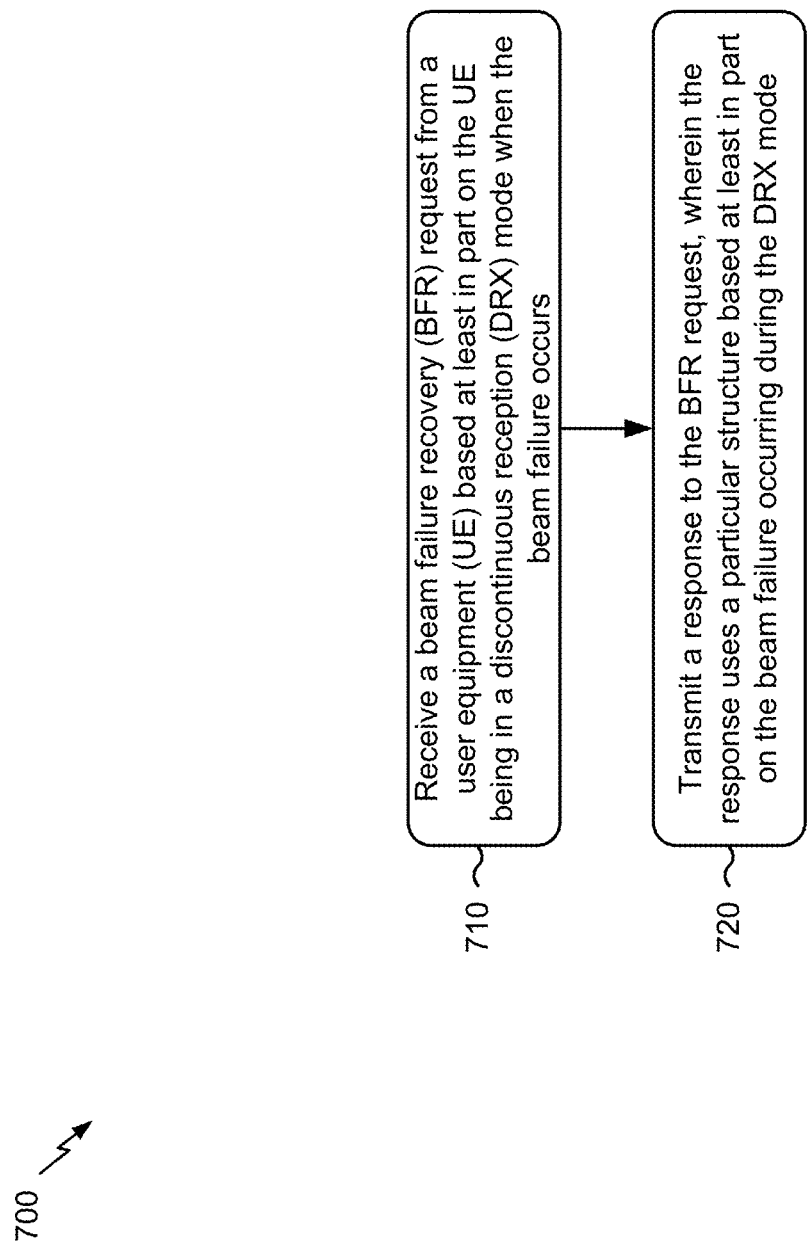
FIG. 7 is a diagram illustrating an example process performed, for example, by a base station, in accordance with various aspects of the present disclosure.

FIG. 7 is a diagram illustrating an example process 700 performed, for example, by a base station, in accordance with various aspects of the present disclosure. Example process 700 is an example where a base station (e.g., BS 110) performs signaling related to a BFR procedure during C-DRX.

As shown in FIG. 7, in some aspects, process 700 may include receiving a beam failure recovery (BFR) request from a user equipment (UE) based at least in part on the UE being in a discontinuous reception (DRX) mode when the beam failure occurs (block 710). For example, the base station (e.g., using antenna 234, DEMOD 232, MIMO detector 236, receive processor 238, controller/processor 240, and/or the like) may receive a BFR request from a UE, as described above, for example, with reference to FIG. 5. The UE may be in a DRX mode (e.g., a C-DRX mode) when the beam failure occurs. For example, the UE may be in a sleep state of the DRX mode when the beam failure occurs.

As shown in FIG. 7, in some aspects, process 700 may include transmitting a response to the BFR request, wherein the response uses a particular structure based at least in part on the beam failure occurring during the DRX mode (block 720). For example, the base station (e.g., using controller/processor 240, transmit processor 220, TX MIMO processor 230, MOD 232, antenna 234, and/or the like) may transmit a response (e.g., a BFR response) to the BFR request, as described above, for example, with reference to FIG. 5. The BFR response may use a particular structure based at least in part on the beam failure occurring during the DRX mode. For example, the base station may determine that the particular structure is to be used based at least in part on the beam failure occurring during the DRX mode.

Process 700 may include additional aspects, such as any single aspect or any combination of aspects described below and/or in connection with one or more other processes described elsewhere herein.

In a first aspect, the particular structure is a downlink control channel without a scheduling grant. In a second aspect, alone or in combination with the first aspect, the response includes downlink control information with a cyclic redundancy check that is scrambled using a cell radio network temporary identifier (C-RNTI). In a third aspect, alone or in combination with any one or more of the first and second aspects, the particular structure is at least one of a particular waveform, a particular downlink sequence, or a reference signal.

In a fourth aspect, alone or in combination with any one or more of the first through third aspects, the base station may receive an acknowledgment or a negative acknowledgment corresponding to the response. In a fifth aspect, alone or in combination with any one or more of the first through fourth aspects, the response includes at least one of information regarding uplink power control for the UE, an uplink grant, a downlink grant, or information indicating that the DRX mode is to be terminated. In a sixth aspect, alone or in combination with any one or more of the first through fifth aspects, the base station may transmit, during an awake period of the DRX mode and after the response is received, information for a BFR procedure.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of aspects. In fact, many of these features may be combined in ways not specifically recited in the claims and/or disclosed in the specification. Although each dependent claim listed below may directly depend on only one claim, the disclosure of aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   transmitting a beam failure recovery (BFR) request based at least in part on detecting a beam failure that occurred while the UE is in a discontinuous reception (DRX) mode; and
   receiving a response to the BFR request, wherein the response is based at least in part on the beam failure occurring during the DRX mode, and wherein the response includes information with a cyclic redundancy check that is scrambled using a cell radio network temporary identifier (C-RNTI).

2. The method of claim 1, wherein, based at least in part on the beam failure occurring during the DRX mode, the response uses a structure that is a downlink control channel without a scheduling grant.

3. The method of claim 1, wherein, based at least in part on the beam failure occurring during the DRX mode, the response uses a structure that is at least one of:
   a particular waveform,
   a particular downlink sequence, or
   a reference signal.

4. The method of claim 1, further comprising:
   transmitting an acknowledgment or a negative acknowledgment corresponding to the response.

5. The method of claim 1, wherein the response includes at least one of:
   information regarding uplink power control for the UE,
   an uplink grant,
   a downlink grant, or
   information indicating that the DRX mode is to be terminated.

6. The method of claim 1, further comprising:
   receiving, during an awake period of the DRX mode and after the response is received, information for a BFR procedure.

7. A method of wireless communication performed by a base station, comprising:
   receiving a beam failure recovery (BFR) request from a user equipment (UE) based at least in part on the UE being in a discontinuous reception (DRX) mode when a beam failure associated with the BFR request occurs; and
   transmitting a response to the BFR request, wherein the response is based at least in part on the beam failure occurring during the DRX mode, and wherein the response includes information with a cyclic redundancy check that is scrambled using a cell radio network temporary identifier (C-RNTI).

8. The method of claim 7, wherein, based at least in part on the beam failure occurring during the DRX mode, the response uses a structure that is a downlink control channel without a scheduling grant.

9. The method of claim 1, wherein, based at least in part on the beam failure occurring during the DRX mode, the response uses a structure that is based at least in part on at least one of:
a particular waveform,
a particular downlink sequence, or
a reference signal.

10. The method of claim 7, further comprising:
receiving an acknowledgment or a negative acknowledgment corresponding to the response.

11. The method of claim 7, wherein the response includes at least one of:
information regarding uplink power control for the UE,
an uplink grant,
a downlink grant, or
information indicating that the DRX mode is to be terminated.

12. The method of claim 7, further comprising:
transmitting, during an awake period of the DRX mode and after the response is transmitted, information for a BFR procedure.

13. A user equipment (UE) for wireless communication, comprising:
a memory; and
one or more processors operatively coupled to the memory, the memory and the one or more processors configured to:
transmit a beam failure recovery (BFR) request based at least in part on detecting a beam failure that occurred while the UE is in a discontinuous reception (DRX) mode; and
receive a response to the BFR request, wherein the response is based at least in part on the beam failure occurring during the DRX mode, and wherein the response includes information with a cyclic redundancy check that is scrambled using a cell radio network temporary identifier (C-RNTI).

14. The UE of claim 13, wherein, based at least in part on the beam failure occurring during the DRX mode, the response uses a structure that is a downlink control channel without a scheduling grant.

15. The UE of claim 13, wherein, based at least in part on the beam failure occurring during the DRX mode, the response uses a structure that is at least one of:
a particular waveform,
a particular downlink sequence, or
a reference signal.

16. The UE of claim 13, wherein the one or more processors are further configured to:
transmit an acknowledgment or a negative acknowledgment corresponding to the response.

17. The UE of claim 13, wherein the response includes at least one of:
information regarding uplink power control for the UE,
an uplink grant,
a downlink grant, or
information indicating that the DRX mode is to be terminated.

18. The UE of claim 13, wherein the one or more processors are further configured to:
receive, during an awake period of the DRX mode and after the response is received, information for a BFR procedure.

19. A base station for wireless communication, comprising:
a memory; and
one or more processors operatively coupled to the memory, the memory and the one or more processors configured to:
receive a beam failure recovery (BFR) request from a user equipment (UE) based at least in part on the UE being in a discontinuous reception (DRX) mode when a beam failure associated with the BFR request occurs; and
transmit a response to the BFR request, wherein the response is based at least in part on the beam failure occurring during the DRX mode, and wherein the response includes information with a cyclic redundancy check that is scrambled using a cell radio network temporary identifier (C-RNTI).

20. The base station of claim 19, wherein, based at least in part on the beam failure occurring during the DRX mode, the response uses a structure that is a downlink control channel without a scheduling grant.

21. The base station of claim 19, wherein, based at least in part on the beam failure occurring during the DRX mode, the response uses a structure that is based at least in part on at least one of:
a particular waveform,
a particular downlink sequence, or
a reference signal.

22. The base station of claim 19, wherein the one or more processors are further configured to:
receive an acknowledgment or a negative acknowledgment corresponding to the response.

23. The base station of claim 19, wherein the response includes at least one of:
information regarding uplink power control for the UE,
an uplink grant,
a downlink grant, or
information indicating that the DRX mode is to be terminated.

24. The base station of claim 19, wherein the one or more processors are further configured to:
transmit, during an awake period of the DRX mode and after the response is transmitted, information for a BFR procedure.

25. An apparatus for wireless communication, comprising:
means for transmitting a beam failure recovery (BFR) request based at least in part on detecting a beam failure that occurred while the apparatus is in a discontinuous reception (DRX) mode; and
means for receiving a response to the BFR request, wherein the response is based at least in part on the beam failure occurring during the DRX mode, and wherein the response includes information with a cyclic redundancy check that is scrambled using a cell radio network temporary identifier (C-RNTI).

26. The apparatus of claim 25, wherein, based at least in part on the beam failure occurring during the DRX mode, the response uses a structure that is a downlink control channel without a scheduling grant.

27. The apparatus of claim 25, wherein, based at least in part on the beam failure occurring during the DRX mode, the response uses a structure that is at least one of:
a particular waveform,
a particular downlink sequence, or
a reference signal.

28. The apparatus of claim 25, further comprising:
means for transmitting an acknowledgment or a negative acknowledgment corresponding to the response.

29. The apparatus of claim 25, wherein the response includes at least one of:
information regarding uplink power control for the apparatus,
an uplink grant,
a downlink grant, or
information indicating that the DRX mode is to be terminated.

30. The apparatus of claim 25, further comprising:
means for receiving, during an awake period of the DRX mode and after the response is received, information for a BFR procedure.

31. An apparatus for wireless communication, comprising:
means for receiving a beam failure recovery (BFR) request from a user equipment (UE) based at least in part on the UE being in a discontinuous reception (DRX) mode when a beam failure associated with the BFR request occurs; and
means for transmitting a response to the BFR request, wherein the response is based at least in part on the beam failure occurring during the DRX mode, and wherein the response includes information with a cyclic redundancy check that is scrambled using a cell radio network temporary identifier (C-RNTI).

32. The apparatus of claim 31, wherein, based at least in part on the beam failure occurring during the DRX mode, the response uses a structure that is a downlink control channel without a scheduling grant.

33. The apparatus of claim 31, wherein, based at least in part on the beam failure occurring during the DRX mode, the response uses a structure that is based at least in part on at least one of:
a particular waveform,
a particular downlink sequence, or
a reference signal.

34. The apparatus of claim 31, further comprising:
means for receiving an acknowledgment or a negative acknowledgment corresponding to the response.

35. The apparatus of claim 31, wherein the response includes at least one of:
information regarding uplink power control for the UE,
an uplink grant,
a downlink grant, or
information indicating that the DRX mode is to be terminated.

36. The apparatus of claim 31, further comprising:
means for transmitting, during an awake period of the DRX mode and after the response is transmitted, information for a BFR procedure.

37. The method of claim 1, wherein the information is downlink control information.

38. The method of claim 7, wherein the information is downlink control information.

39. The UE of claim 13, wherein the information is downlink control information.

40. The base station of claim 19, wherein the information is downlink control information.

41. The apparatus of claim 25, wherein the information is downlink control information.

42. The apparatus of claim 31, wherein the information is downlink control information.

\* \* \* \* \*